(12) United States Patent
Chai et al.

(10) Patent No.: US 12,711,154 B2
(45) Date of Patent: Aug. 18, 2026

(54) SERVING OPTIMIZATION IN A LARGE-SCALE SERVING SYSTEM

(71) Applicant: Google LLC, Mountain View, CA (US)

(72) Inventors: Hongjie Chai, Palo Alto, CA (US); Lan Luan, San Jose, CA (US); Javesh Garg, Mountain View, CA (US); Jinyuan Li, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 158 days.

(21) Appl. No.: 18/848,019

(22) PCT Filed: Jun. 14, 2023

(86) PCT No.: PCT/US2023/025313

§ 371 (c)(1),
(2) Date: Sep. 17, 2024

(87) PCT Pub. No.: WO2024/258404

PCT Pub. Date: Dec. 19, 2024

(65) Prior Publication Data

US 2026/0187102 A1 Jul. 2, 2026

(51) Int. Cl.
*G06F 16/28* (2019.01)

(52) U.S. Cl.
CPC .................................. *G06F 16/285* (2019.01)

(58) Field of Classification Search
CPC ......... G06F 3/065; G06F 3/067; G06F 16/285
USPC ....... 707/692, 640, 652, 737, 639, 624, 969, 707/974, 638, 633
See application file for complete search history.

(56) References Cited

U.S. PATENT DOCUMENTS 8,255,516 B1 * 8/2012 Zhang ..................... H04L 67/10 709/224
8,560,639 B2 * 10/2013 Murphy .............. G06F 16/1844 707/610
8,769,055 B2 * 7/2014 Murphy .............. G06F 11/3055 709/219

(Continued)

OTHER PUBLICATIONS

International Search Report and Written Opinion for PCT/US2023/025313, mailed on Dec. 11, 2023, 13 pages.

(Continued)

*Primary Examiner* — Jorge A Casanova
(74) *Attorney, Agent, or Firm* — DORITY & MANNING P.A.

(57) ABSTRACT

Methods, computing systems, and technology for automatically classifying content items to be stored in a serving system. The system can include one or more processors and a plurality of serving servers. The plurality of serving servers can include a first server and a second server. The system can classify a first content item with a first-tier label based on a performance attribute of the first content item. Additionally, the system can classify a second content item with a second-tier label based on a performance attribute of the second content item. Moreover, the system can classify a third content item with a second-tier label based on a performance attribute of the third content item. Furthermore, the system can store the first content item and the second content item in the first server. Also, the system can store the first content item and the third content item in the second server.

20 Claims, 8 Drawing Sheets

(56) References Cited

U.S. PATENT DOCUMENTS

| | | | | |
|---|---|---|---|---|
| 8,914,517 | B1 * | 12/2014 | Shpilyuck | G06F 9/5083 709/224 |
| 10,725,707 | B2 * | 7/2020 | Greenwood | G06F 3/0685 |
| 11,283,690 | B1 | 3/2022 | Mosier et al. | |
| 2006/0212650 | A1 | 9/2006 | Hwang et al. | |
| 2008/0255915 | A1 | 10/2008 | Collins et al. | |
| 2010/0145763 | A1 | 6/2010 | Swanson | |
| 2010/0146144 | A1 | 6/2010 | Audenaert et al. | |
| 2010/0287134 | A1 | 11/2010 | Hauser | |
| 2011/0178986 | A1 * | 7/2011 | Prahlad | G06F 3/0605 707/736 |
| 2011/0238496 | A1 | 9/2011 | Gurbuxani et al. | |
| 2014/0310714 | A1 * | 10/2014 | Chan | G06F 16/285 718/102 |
| 2014/0379715 | A1 * | 12/2014 | Kesselman | G06F 3/067 707/737 |
| 2016/0180376 | A1 | 6/2016 | Lu et al. | |
| 2016/0188700 | A1 * | 6/2016 | Kleinschnitz, Jr. | G06F 16/285 707/738 |
| 2016/0299711 | A1 * | 10/2016 | Bolik | G06F 3/0647 |
| 2018/0253261 | A1 * | 9/2018 | Kripalani | G06F 3/0604 |
| 2020/0293951 | A1 * | 9/2020 | Johnston | G06F 16/906 |
| 2023/0018773 | A1 * | 1/2023 | Sudevalayam | G06F 3/0611 |
| 2023/0117942 | A1 * | 4/2023 | Sheppard | G06F 16/2255 707/740 |

OTHER PUBLICATIONS

International Preliminary Report on Patentability for Application No. PCT/US2023/025313 mailed Dec. 26, 2025, 9 pages.

* cited by examiner

SERVING OPTIMIZATION IN A LARGE-SCALE SERVING SYSTEM

PRIORITY CLAIM

This application is based upon and claims the right of priority under 35 U.S.C. § 371 to International Application No. PCT/US2023/025313 filed on Jun. 14, 2023, which is incorporated by reference herein.

FIELD

The present disclosure relates generally to serving optimization in a large-scale serving system and more particularly to methods and systems for selective loading techniques of content items.

BACKGROUND

A large-scale serving system refers to a system designed to handle a high volume of requests and serve data or content to a large number of users or clients. The large-scale serving systems can include large web services, content delivery networks, search engines, and databases. Building and maintaining large-scale serving systems pose unique challenges associated with handling high loads and providing reliable service.

In the context of a large-scale serving system, serving optimization generally refers to the process of fine-tuning the system to provide fast and reliable service to users, even under heavy loads or during peak usage times. Serving optimization can include load balancing, caching, parallel processing, data partitioning, resource management, auto-scaling, and database optimization.

SUMMARY

Aspects and advantages of embodiments of the present disclosure will be set forth in part in the following description, or can be learned from the description, or can be learned through practice of the embodiments.

One example aspect of the present disclosure is directed to a computing system for serving content items. The system can include one or more processors and a plurality of serving servers. The plurality of serving servers can include a first server and a second server. The system can include one or more non-transitory computer-readable media that collectively store instructions that, when executed by the one or more processors, cause the computing system to perform operations. The operations can include classifying a first content item with a first-tier label based on a performance attribute of the first content item. Additionally, the operations can include classifying a second content item with a second-tier label based on a performance attribute of the second content item. The performance attribute of the second content item can be less than a threshold value. Moreover, the operations can include classifying a third content item with a second-tier label based on a performance attribute of the third content item. The performance attribute of the third content item can be less than the threshold value. Furthermore, the operations can include storing the first content item and the second content item in the first server. Also, the operations can include storing the first content item and the third content item in the second server.

In some instances, the operations can include classifying a fourth content item with a first tier-label based on a performance attribute of the fourth content item. The performance attribute of the fourth content item can be above the threshold value. Additionally, the operations can include storing the fourth content item in both the first server and the second server.

In some instances, the plurality of servers includes a third server. Additionally, the operations can further include classifying a fifth content item with a second tier-label based on a performance attribute of the fifth content item being below the threshold value. Furthermore, the operations can include storing the fifth content item in the third server.

In some instances, the system can include a plurality of first-tier content items. The plurality of first-tier content items can include content items classified with the first-tier label, such as the first content item and the fourth content item. Additionally, the system can include a plurality of second-tier content items. The plurality of second-tier content items can include content items classified with the second-tier label. Each content item in the plurality of first-tier content items can have a performance attribute above a threshold value, and each content item in the plurality of second-tier content items can have a performance attribute below a threshold value. Moreover, the operations can further include storing the plurality of first-tier content items in all of the servers in the plurality of servers (e.g., the first server and second server). Furthermore, the operations can include storing a first subgroup of the plurality of second-tier content items in the first server and storing a second subgroup of plurality second-tier content items in the second server. The second subgroup includes content items that are not included in the first subgroup. For example, the system can divide the second-tier content items into a plurality of subgroups and store each subgroup in the plurality of subgroups in a server in the plurality of servers.

In some instances, the operations can further include obtaining first-tier performance metrics associated with a plurality of content items classified with the first-tier label. Additionally, the operations can include obtaining second-tier performance metrics associated with a plurality of content items classified with the second-tier label. Moreover, the operations can include processing the first-tier performance metrics and the second-tier performance metrics, using a machine-learned model, to determine the threshold value.

In some instances, the first server stores content items that are served in a first geographical region, and the second server stores content items that are served in a second geographical region. Additionally, the second content item can include a first targeting condition being associated with the first geographic region, and the third content item can include a second targeting condition being associated with the second geographic region. The targeting conditions can be obtained from a machine-learned model (e.g., machine-learning algorithms), a third-party entity, and/or information derived from the content item. For example, the third-party entity can be a merchant that is associated with a product presented in the content item. Information derived from the content item can include information about an object (e.g., product) that is presented in the content item. For example, the first target condition can be received from a merchant associated with the second content item. Moreover, the operations can include determining to store the second content item in the first server based on the first target condition. Furthermore, the operations can include determining to store the third content item in the second server based on the second target condition.

In some instances, the performance attribute is associated with a number of impressions over a specified period of time. Additionally, the performance attribute can be determined (e.g., calculated, predicted) using a machine-learned prediction model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
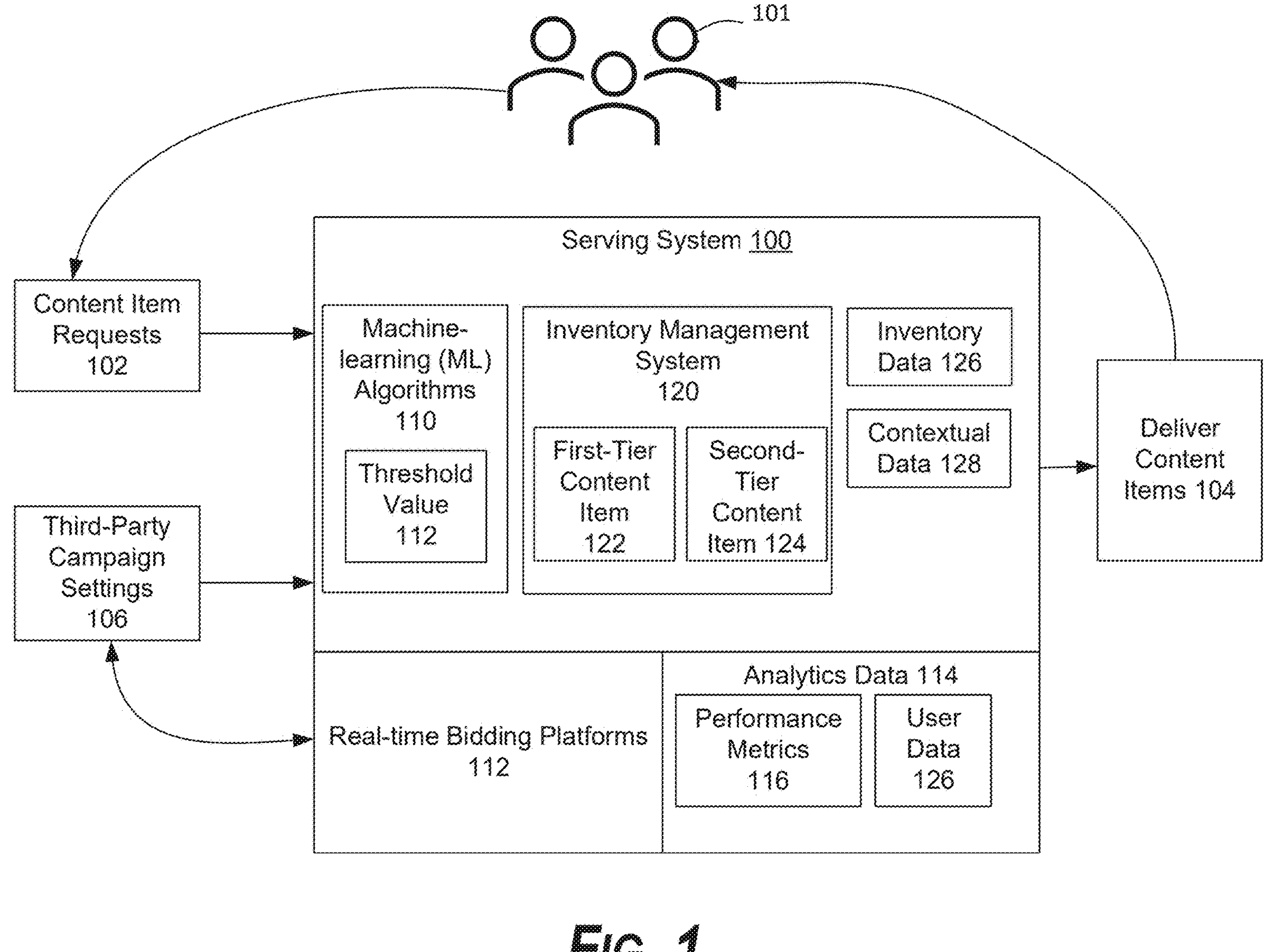
FIG. 1 depicts a block diagram of an example serving system that serves content items according to example embodiments of the present disclosure.

Reference numerals that are repeated across plural figures are intended to identify the same features in various implementations.

DETAILED DESCRIPTION

Overview

Generally, the present disclosure is directed to serving optimization in large-scale serving systems. Large-scale serving systems, such as serving systems for shopping advertisement, have been growing rapidly over the past years, primarily driven by exponential growth in the volume of offers and products for shopping. Traditionally, a serving system can include a serving index with all of the content items (e.g., shopping offers). In some instances, the content items can be uploaded by merchants through feeds and/or can be automatically generated based on user input. Additionally, the content items can be associated with products that are being sold by merchants, and the serving index can include these products and their association with the content items. However, a substantial percentage of the content items (e.g., the products, the offers) in the serving index bring limited value because these content items have a low performance value. For example, a content item that has less than one impression over a specific period of time (e.g., 90 days) can have a low performance value.

As described herein, by utilizing selective loading policies of content items in the serving index, the system can optimize the serving system. Recognizing the diminishing return of keep increasing the serving infrastructure, techniques described herein enable implementing solutions that load content items into the serving index that bring value. The selective loading techniques enable a server administrator to set the pace of serving infrastructure growth, instead of being dependent on the number of content items being uploaded by merchants.

Additionally, to improve latency and user experience, the content items in the serving system can be replicated into many identical replicas across the world. The cost of serving normally scales linearly to the number of content items stored in the serving system. Additionally, it has been observed that a majority of content items loaded in the serving system may not receive an impression over an extended period of time. In some instances, content items that have not received an impression over an extended period of time can be labeled as second-tier content items. For example, content items having a performance attribute below a threshold value can be labeled as second-tier and contents items having a performance attribute above a threshold value can be labeled as first-tier. In one embodiment, the performance attribute can be a number of impressions over a period of time (e.g., 24 hours, 30 days), and a first group of content items can be labeled as first-tier if the number of impression over the period of time is above a threshold value (e.g., 1) and a second group of content items can be labeled as second-tier if the number of impression less than the threshold value. As described herein, better utilization of computing resources can occur by reducing the loading of the low-value content items in the serving system, which can potentially save companies millions of dollars.

However, it can be a challenge to reliably identify second-tier (e.g., low-value) content items since some content items may be idle for an extended period of time, but suddenly become relevant due to various reasons. The percentage of such content items can be very low but cannot be ignored given the large total number of content items. Additionally, simply excluding the second-tier content items from the serving system may raise quality concerns and make the repository of content items incomplete. Simply said, some content items would never be served. Further, since the value of a content item can be typically measured based on its performance history, excluding the second-tier content items from the serving system would deprive these content items of the opportunity to prove themselves in the future, and consequently for the serving system to learn. Such an approach would only work for a static handling of content items (i.e. with a performance set once) and therefore not allow dynamic updates to the performance attributes of the items stored in repositories.

Due to the above mentioned challenges, there are several conventional optimization techniques for handling second-tier content items. In a first conventional optimization technique, the system can load all content items into a serving system and improve resource savings (e.g., CPU, latency) by only allowing retrieval and serving of second-tier content items in a fraction (e.g., less than 10%) of the user search traffic. The first optimization technique has limited resource saving because this technique still includes all of the second-tier content items into serving corpus.

In a second conventional optimization technique, the system may only load the first-tier content items into a serving system. Additionally, the system can set up an experimental serving corpus which includes all the contents and run large-scale simulation to identify content items which are currently classified as second-tier content items but should be classified as first-tier content items to be included in the serving corpus (e.g., serving index). The second optimization technique saves serving cost by reducing the size of serving corpus, but the cost of large scale simulation may offset some of the cost saving.

In a third conventional optimization technique, the system may only load the first-tier content items into a serving system and rotate the second-tier content items (e.g., remaining contents) into and out of the serving corpus on a round-robin basis. The third optimization technique can saves serving cost by reducing the size of serving corpus but includes the disadvantage that some second-tier content items that become relevant once part of the serving corpus may have to wait a long time (e.g., days or weeks) until they are rotated back into the serving corpus, and consequently prove themselves.

Techniques described herein provide a novel approach to significantly reduce the size of serving corpus. Additionally, these techniques can avoid the need for a large scale simulation as described in the second conventional optimization technique and the disadvantage of extra delay (e.g., days, weeks) introduced by the rotation implementation as described in the third conventional optimization technique. According to some embodiments, instead of loading identical content items into all serving replicas across the world, the system can load the first-tier content items into all the serving corpus across the world and the system can divide the second-tier content items among the serving replicas so that each serving replica contains a unique subset of the second-tier contents. For example, there can be five serving replicas, and the system can evenly divide the second-tier content items into five unique subsets, and each unique subset can be loaded into a different serving replica.

Using the techniques described herein, the system can reduce the size of all serving replicas significantly. For example, when 25% of all content items are first-tier content items and 75% of all content items are second-tier content items, then the size of the serving replicas can be reduced by 60%, thereby saving considerable storage over conventional techniques described previously. In this example, the 75% of all content items that are second-tier content items can be evenly divided into five subsets, where each subset can include 15% of all content items. Continuing with this example, the system can load the 25% of all content items that are first-tier content items and a first subset of the second-tier content items that includes 15% of all content items into a first serving replica. The first serving replica would contain a total of 40% of all content items, which is a 60% reduction when compared to loading all of the content items in every serving replica. The reduction can increase if the system includes a higher proportion of second-tier content items or a greater number of serving replicas. Additionally, given that all of the second-tier content items are presented in the serving corpus spatially at all times, the system minimized the delay for second-tier content items to be impressed by users.

Examples of the disclosure provide several technical effects, benefits, and/or improvements in computing technology related to large-scale serving systems. The serving optimization enables efficient use of system resources by optimizing (e.g. reducing significantly the size of) the database (e.g., repository) and serving index to improve access speed and database performance. Additionally, improving the data structures and algorithms for data partitioning improves the performance of the serving system with more efficient processing. Moreover, techniques described herein improve resource management by efficiently allocating system resources (e.g., memory, network bandwidth) among the different tasks and processing running on the plurality of servers. Furthermore, by reducing memory usage, the system can be able to auto-scale the inventory management system.

Additionally, the selective loading techniques as described herein enable that not all of the data (e.g., content items) or resources are loaded into the system or kept in memory at once. Instead, the serving system selectively loads content items that are likely to be needed in the near future, based on factors like past access patterns, user behavior, or other predictive models using machine-learning algorithms. The selective loading techniques can provide technical improvements over current systems by efficient resource usage. For example, by only loading data that is likely to be needed, the serving system can make more efficient use of computing resources like memory and processing resources. Additionally, the selective loading techniques can improve performance by reducing the size of the serving index, so that the serving system can respond to requests more quickly, thus improving performance. Moreover, the selective loading techniques can improve scalability by reducing the amount of data that needs to be in a server at any one time, thus making it easier to scale the system to handle larger amounts of data. With these loading techniques, first tier content items can be available at multiple server locations, and served from the closest one to a requesting device, thereby reducing the latency and retrieval time of content item delivery. The present techniques allow latency for only second tier content items since they are stored at a single server location that might not be in proximity of the requesting client device. As they are less likely to be served, such latency will have a limited impact on the overall performance of the serving system, while enabling a complete repository (i.e., a serving system that gives room to update the performance attributes of the items over time).

With reference now to the Figures, example embodiments of the present disclosure will be discussed in further detail.

FIG. 1 depicts a block diagram of an example serving system that serves content items according to example embodiments of the present disclosure. The serving system 100 can be a large-scale content serving system. The serving system 100 can be an infrastructure platform designed to handle a high volume of content item requests 102 from users, deliver content items 104 to users 101, and manage third-party campaigns 106 for presenting content items.

The serving system 100 can handle millions or even billions of content item impressions per day. The serving system 100 can be capable of processing a massive number of content item requests within a short period. The serving system 100 can manage complex content item operations, delivering content items at scale, and optimizing campaigns efficiently. The serving system 100 can handle the complexities of targeting, inventory management, and real-time content item serving.

The serving system 100 can employ machine-learning (ML) algorithms 110 to efficiently handle incoming content item requests and determine a content item to present to a user. For example, the ML algorithms 110 can utilize distributed computing techniques to improve the efficiency of serving content items and determine a content item to present. Additionally, the serving system 100 can incorporate ML algorithms 110 to deliver highly relevant content items to specific audience segments and maximize campaign performance. The ML algorithms 110 can determine a threshold value 112 based on the generated performance metrics 116. The serving system can determine a classification (e.g., first-tier, second-tier) of the content item based on the threshold value 112. In some instances, the ML algorithms can determine a plurality of threshold values (e.g., low value, mid value, high value) based on the performance metrics, and each threshold value can be associated with a classification (e.g., first-tier, second-tier, third-tier) of the content item.

Additionally, the serving system includes an inventory management system 120 for managing the content items. The inventory management system 120 can include first-tier content items 122 and second-tier content items 124. The inventory management system 120 can include a plurality of servers that maintain an inventory of include first-tier content items 122 and second-tier content items 124. The inventory management system 120 can manage the allocation of content item impressions across various publishers and platforms. The serving system 100 can be integrated with real-time bidding platforms 113, which allows for automated, real-time bidding on content item impressions.

The inventory management system 120 can organize, track, and optimize the available content items that can be used to display content items on websites, mobile apps, or other digital platforms. The inventory management system 120 can manage and optimize the utilization of content items to generate revenue for publishers and deliver targeted content items to users. The inventory management can include inventory tracking that keeps track of the availability and status of slots for presenting content items. The inventory management system 120, using the ML algorithms, can process content-related information (e.g., content item slot impressions, content item click-through rates, content item fill rates, historical data, trends, and demand projections) to determine a classification for the content item and/or to predict the performance and utilization of each slot. For example, the inventory management system 120, using the ML algorithms, can process historical data, trends, and demand projections to forecast the availability of slots and the likelihood that a content item is presented during the slots.

Additionally, the inventory management system 120 can apply targeting conditions to content items. For example, a publisher or a merchant can define specific targeting conditions, such as demographic information, geographic location, or user behavior, to match the content items with the appropriate audience segments. In some instances, the targeting conditions can be obtained from a machine-learned model (e.g., machine-learning algorithms 110) based on information derived from the content item. Information derived from the content item can include information about an object (e.g., product) that is presented in the content item. For example, the serving system 100 can load the second-tier content items to a server (e.g., replica server) based on the targeting condition (e.g., geographic location). The inventory management system 120 can allocate available content item inventory to different advertising campaigns based on their targeting condition, budget, and priority to ensure that relevant content items are displayed in the designated slots. Furthermore, the inventory management system 120 can monitor and optimize the performance of content item inventory using analytics data 114. The ML algorithms 110 and publishers can analyze performance metrics 116 (e.g., impressions, click-through rates, viewability, and revenue generated) to optimize the serving system 100. The ML algorithms 110 can then make data-driven decisions to optimize the classification of content items and determine which servers each content item should be uploaded to.

Moreover, the inventory management system 120 can include a serving corpus. The serving corpus can include a collection of data that the serving system 100 uses to make decisions about which content item to deliver and to optimize the serving process. The serving corpus consists of various information sources and datasets that help inform the ML algorithms 110 decision-making. The serving corpus can include the first-tier content items 122 and the second-tier content items 124. The content item can include actual ad creatives, such as images, videos, or HTML code, that can be served to users. The content items can be stored within the inventory management system 120 and can be selected and delivered based on targeting criteria and third-party campaign settings 106.

The inventory management system 120 can organize, track, and optimize the content items (e.g., first-tier content items 122, second-tier content items 124) to display the content items on websites, mobile apps, or other digital platforms. The inventory management system 120 can optimize the utilization of the content item inventory to generate revenue for publishers and deliver targeted content to advertisers. The inventory management system 120 can include content tracking that keeps track of the availability and status of content slots. The inventory management system 120 can provide analytics data 114 to the ML algorithms 110 to improve the performance of the serving system 100. Additionally, the ML algorithms 110 can identify areas for improvement based analytics data 114. The analytics data 114 can include content slot impressions, content click-through rates, content fill rates, historical data, trends, impressions, click-through rates, viewability, revenue generated, and so on. The ML algorithms can make data-driven decisions to optimize the storage, classification (e.g., first-tier content items 122, second-tier content items 124), placement, pricing, and targeting of content items and content slots.

Furthermore, the inventory management system 120 can perform creative indexing based on the classification (e.g., first-tier content items 122, second-tier content items 124) of the content item. The inventory management system 120 can organize and categorize the content items based on classification to ensure efficient storage of the content items in the serving servers. The inventory management system 120 can store the content items in a server based on the classification of the content item. The content items can include images, videos, HTML code, or other media formats. Additionally, the content items can include creative metadata. Creative metadata can include metadata that describes its characteristics and properties. The creative metadata may include information such as dimensions, file size, format, duration (for videos), and any special features or interactivity. The content items can include targeting attributes. The inventory management system 120 can determine which serving server to store a content item based on the targeting attributes. The targeting attributes can define the audience segments or criteria that the creatives are intended to reach. For example, a content item can have a targeting attribute that is associated with a particular demographic group or for users in specific geographic locations.

By effectively indexing and categorizing the content items based on the classification (e.g., first-tier content items 122, second-tier content items 124), the serving system 100 can reduce the processing speed to identify the most relevant content items to serve based on the targeting parameters specified in each request. This ensures that the right content item is delivered to the right audience, improving the overall effectiveness of advertising campaigns.

The serving system 100 can incorporate user data 126, such as demographics, interests, browsing behavior, location, or device information. The ML algorithms 110 can process the user data 126 to understand the characteristics and preferences of individual users, enabling more targeted content delivery.

The serving system 100 can include performance metrics 116. The performance metrics can include historical performance data, which consists of information about past campaigns, including impressions, clicks, conversions, engagement metrics, and other relevant performance indicators. The performance metrics 116 is used to analyze the effectiveness of different ads, targeting strategies, and to optimize future ad delivery.

The serving system 100 can include inventory data 126. The inventory data 126 can include available ad inventory, including information about ad slots, placements, sizes, formats, and targeting options. The inventory data 126 can assist the ML algorithms 110 match content items to the appropriate inventory and make determinations about which content item to serve based on available slots and targeting criteria.

The serving system 100 can include contextual data 128. Contextual data 128 can provide information about the content and context in which the content item will be displayed. Contextual data 128 can include data about the webpage or app content, keywords, topics, or other relevant contextual signals. Contextual data 128 is used to ensure that the content item served is contextually relevant and aligned with the surrounding content.

In some instances, the serving system 100, including the ML algorithms 110, can use external data sources. For example, the serving system 100 can integrate external data sources into the inventory management system 120. The external data sources can include third-party data providers, data management platforms (DMPs), or other sources that offer additional insights about users, such as offline purchase data or behavioral data.

The serving system 100 can continually update and refine the inventory management system 120 as new data becomes available and as campaigns run and generate analytics data 114. Ad servers leverage this comprehensive dataset to optimize ad targeting, maximize performance, and deliver relevant and engaging ads to the target audience.

Furthermore, the serving system 100 can provide comprehensive reporting based on analytics data 114 by tracking performance attributes (e.g., impressions, clicks, conversions) to generate performance metrics 116. As previously mentioned, the threshold value 112 can be determined based on the performance metrics 116. In some instances, the threshold value 112 can be utilized to classify the content items as either a first-tier content item 122 or a second-tier content item 124. For example, a content item having a performance attribute (e.g., less than two impressions in a month) that is below the threshold value 112 can be classified as a second-tier content item. Alternatively, a content item having a performance attribute (e.g., two or more impressions in a month) that is above or equal to the threshold value can be classified as a first-tier content item.

Figure 2:
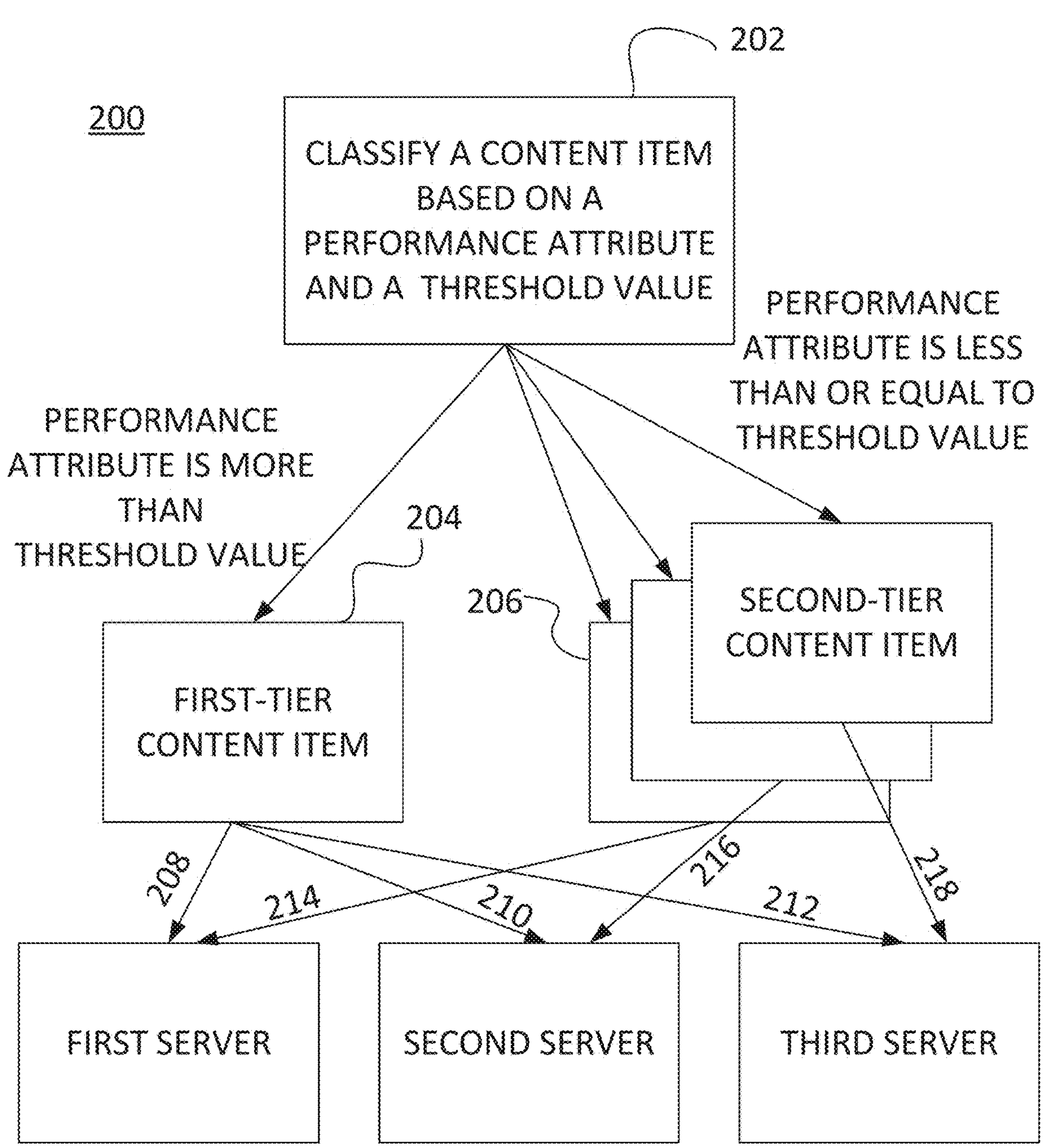
FIG. 2 depicts a block diagram of an example serving system that classifies content items according to example embodiments of the present disclosure.

FIG. 2 depicts a flow diagram 200 of an example serving system that classifies content items according to example embodiments of the present disclosure. In some instances, the system (e.g., serving system 100) can receive a content item. For example, a third-party (e.g., merchant) can upload the content item to the system. The content item can be associated with a performance attribute (e.g., number of impressions over a specific period of time). The system can classify the content item based on a performance attribute and/or a threshold value at 202. As previously mentioned, the threshold value can be determined by the ML algorithms 110.

When the performance attribute is more than the threshold value, then the system can classify the content item as a first-tier content item at 204. Alternatively, when the performance attribute is less than or equal to the threshold value, then the system can classify the content item as a second-tier content item at 206.

Additionally, the system can include a plurality of servers (e.g., first server, second server, third server). As previously mentioned, to improve latency and user experience, the content items in the serving system can be replicated into many identical replicas that are positioned in different geographic locations.

Based on the classification operations performed at operations 202, 204, and 206, the system can include a plurality of first-tier content items and a plurality of second-tier content items. The plurality of first-tier content items can include content items classified with the first-tier label. The plurality of second-tier content items can include content items classified with the second-tier label.

Subsequently, the system can store the content items that were classified as a first-tier content item at 204 in all of the servers of the plurality of servers. For example, a first-tier content item can be stored in the first server at operation 208, in the second server at operation 210, and in the third server at operation 212. All of the content items that have a first-tier classification can be stored in all of the servers in the plurality of servers.

Furthermore, the system can divide the content items that were classified as a second-tier content item at 206 into different subgroups. The system can store each subgroup in a different server in the plurality of servers. For example, a second-tier content item can be stored in the first server at operation 214. Another second-tier content item can be stored in the second server at operation 216, and yet another second-tier content item can be stored in the third server at operation 218.

In some instances, to improve latency, the first server can be located in a first geographical location (e.g., Europe) and serve content items to the first geographical location. Similarly, the second server can be located in a second geographical location (e.g., Asia) and server content items to the second geographical location. Additionally, the content items can include targeting conditions, such as geographical region of interest. Therefore, in some embodiments, the second-tier content items can be stored in the first server of the plurality of servers based on the geographical location of the first server and the targeting conditions of the second-tier content item. For example, the targeting condition of the second-tier content item can be that the content item is preferred to be presented to users in Europe, then the ML algorithms 110 can determine that this second-tier content item is to be stored in the first server, instead of the second and third servers.

Example Methods

Figure 3:
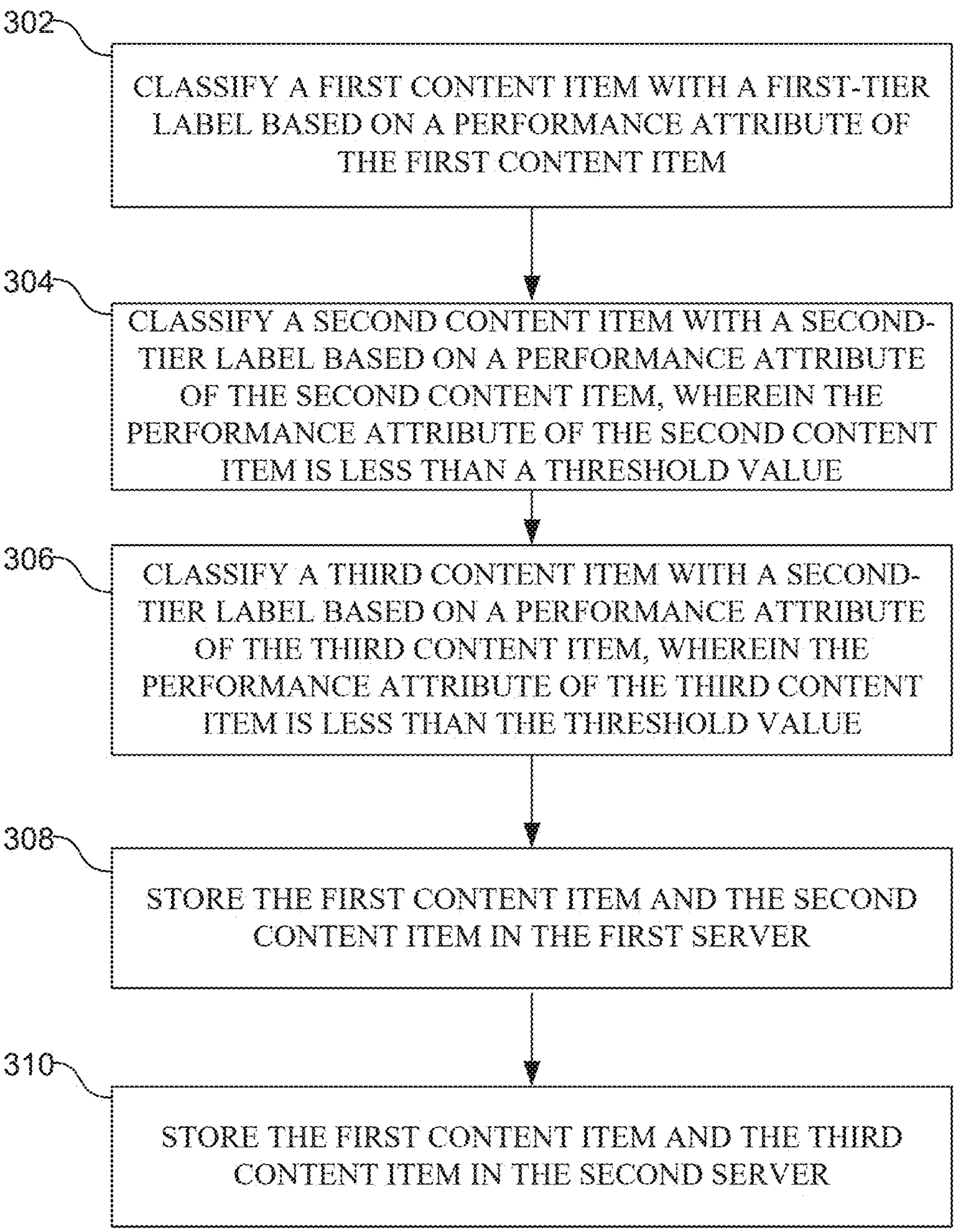
FIG. 3 depicts a flow chart diagram of an example method to classify content items in a serving system according to example embodiments of the present disclosure.

FIG. 3 depicts a flow chart diagram of an example method 300 to classify content items in a serving system according to example embodiments of the present disclosure. Example method 300 can be implemented by one or more computing systems (e.g., one or more computing systems as discussed with respect to FIGS. 1 to 6C). Although FIG. 3 depicts steps performed in a particular order for purposes of illustration and discussion, the methods of the present disclosure are not limited to the particularly illustrated order or arrangement. The various steps of method 300 can be omitted, rearranged, combined, and/or adapted in various ways without deviating from the scope of the present disclosure.

As previously described in FIG. 1, a third-party (e.g., merchant) can upload a content item in the serving system (e.g., serving system 100). Alternatively, the serving system, using machine-learning algorithms (e.g., machine-learning algorithms 110) and generative artificial intelligence (AI) techniques, can generate content items.

According to some embodiments, a computing system (e.g., serving system 100) can obtain (e.g., access, receive) content items. For example, the content items can be received from a merchant or generated by the computing system. The content items can include a first content item, a second content item, a third content item, a fourth content item, and so on.

Additionally, the computing system can include a plurality of serving servers. The plurality of serving servers include a first server, a second server, a third server, and so on. Each server in the plurality of serving servers can be located in a different geographic location (e.g., in order to reduce latency). In some instances, in conventional systems, the content items in the serving system can be replicated into many identical replica servers across the world. As described herein, better utilization of computing resources can occur by reducing the loading of the second-tier content items in the serving system, which can potentially save companies millions of dollars.

At 302, the computing system can classify a first content item with a first-tier label based on a performance attribute of the first content item. The performance attribute of the first content item can be above or equal to a threshold value. For example, when the performance attribute of the first content item is equal to or above a threshold value, then the first content item can be classified as a first-tier content item (e.g., first-tier content item 122). As previously described in FIG. 1, the threshold value can be determined by the ML algorithms 110.

At 304, the computing system can classify a second content item with a second-tier label based on a performance attribute of the second content item. For example, when the performance attribute of the second content item is less than a threshold value, then the second content item can be classified as a second-tier content item (e.g., second-tier content item 124).

In some instances, the performance attribute is associated with a number of impressions over a specified period of time. Additionally, the performance attribute can be determined (e.g., calculated, predicted) using a machine-learned prediction model.

In some instances, the system can obtain first-tier performance metrics associated with a plurality of content items classified with the first-tier label. Additionally, the system can obtain second-tier performance metrics associated with a plurality of content items classified with the second-tier label. Moreover, the system can process the first-tier performance metrics and the second-tier performance metrics, using a machine-learned model, to determine the threshold value.

At 306, the computing system can classify a third content item with a second-tier label based on a performance attribute of the third content item, wherein the performance attribute of the third content item is less than the threshold value. For example, when the performance attribute of the third content item is less than a threshold value, then the third content item can be classified as a second-tier content item (e.g., second-tier content item 124).

At 308, the computing system can store the first content item and the second content item in the first server. As described in FIG. 2, the first-tier content items, such as the first content item, can be stored (e.g., loaded) in each server in the plurality of servers. Additionally, as described in FIG. 2, the second-tier content items can be divided into subgroups, and each subgroup can be stored in a different server in the plurality of servers. In the example of method 300, the second content item, which is classified as a second-tier content item, can be stored in the first server.

At 310, the computing system can store the first content item and the third content item in the second server. In the example of method 300, the first content item, which is classified as a first-tier content item, can be stored in both the first and second servers. Additionally, in the example of method 300, the third content item, which is classified as a second-tier content item, can be stored in the second server.

In some instances, the computing system can classify a fourth content item with a first tier-label based on a performance attribute of the fourth content item. The performance attribute of the fourth content item can be above the threshold value. As described in FIG. 2, the first-tier content items, such as the fourth content item, can be stored in each server in the plurality of servers. Thus, the computing system can store the fourth content item in both the first server and the second server.

In some instances, the plurality of servers can include a third server. Additionally, the computing system can classify a fifth content item with a second tier-label based on a performance attribute of the fifth content item being below the threshold value. Additionally, as described in FIG. 2, the second-tier content items can be divided into subgroups, and each subgroup can be stored in a different server in the plurality of servers. Furthermore, given that the second content item is stored in the first server and the third content item is stored in the second server, the computing system can store the fifth content item in the third server.

In some instances, the system can include a plurality of first-tier content items. The plurality of first-tier content items can include content items classified with the first-tier label, such as the first content item and the fourth content item. Each content item in the plurality of first-tier content items can have a performance attribute above a threshold value.

Additionally, the system can include a plurality of second-tier content items, such as the second content item, third content item, and fifth content item. The plurality of second-tier content items can include content items classified with the second-tier label. Each content item in the plurality of second-tier content items can have a performance attribute below a threshold value.

Moreover, the system can store the plurality of first-tier content items in all of the servers in the plurality of servers (e.g., the first server and second server). Furthermore, the system can store a first subgroup of the plurality of second-tier content items in the first server and store a second subgroup of plurality second-tier content items in the second server. The second subgroup includes content items that are not included in the first subgroup. For example, the system can divide the second-tier content items into a plurality of subgroups and store each subgroup in the plurality of subgroups in a server in the plurality of servers. For example, the second content item classified at 304 can be stored in the first server, the third content item classified at 306 can be stored in the second server, and the fifth content item can be stored in the third server.

In some instances, to improve latency, the first server can be located in a first geographical location (e.g., Europe) and serve content items to the first geographical location. Similarly, the second server can be located in a second geographical location (e.g., Asia) and server content items to the second geographical location. Additionally, the content items can include targeting conditions, such as geographical region of interest.

In some instances, the first server stores content items that are served in a first geographical region, and the second server stores content items that are served in a second geographical region. Additionally, the second content item and third content item were previously classified as second-tier content items at 304 and 306. The second content item can include a first targeting condition being associated with the first geographic region, and the third content item can include a second targeting condition being associated with the second geographic region. The targeting conditions can be obtained from a merchant. Moreover, the system can determine to store the second content item in the first server based on the first target condition. Furthermore, the system can determine to store the third content item in the second server based on the second target condition.

In some instances, the ML algorithm 110 can determine a server in the plurality of servers to store a content item based on the targeting condition.

In some instances, the performance attribute of the second content item can be updated to be more than the threshold value. For example, the performance attribute can be a number of impressions in a month, and the number of impressions in a month for the second content item can have increased to be above the threshold value. Continuing with this example, the system can reclassify the second content item as a first-tier content item. As a result, the system can store the second content item in the second server and the third server. As previously mentioned at 308, the second content item is already stored in the first server.

In some instances, the performance attribute of the first content item can be updated to be less than the threshold value. For example, the performance attribute can be a number of impressions in a month, and the number of impressions in a month for the first content item can have decreased to be below the threshold value. As previously mentioned at 310, the first content item is already stored in the first server and second server. As a result, the system can classify the first content item as a second-tier content item. Additionally, the system can remove the first content item from the second server.

Figure 4:
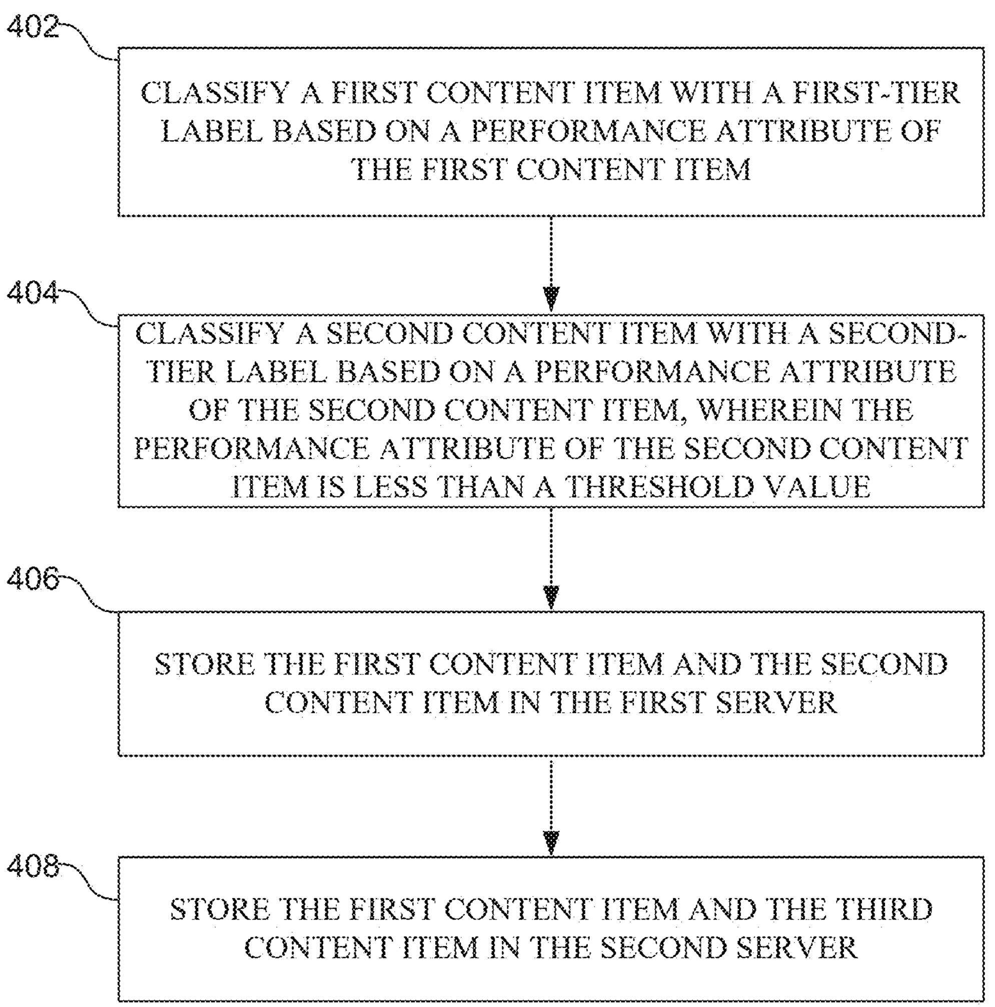
FIG. 4 depicts a flow chart diagram of another example method to classify content items in a serving system according to example embodiments of the present disclosure.

FIG. 4 depicts a flow chart diagram of another example method to classify content items in a serving system according to example embodiments of the present disclosure. As previously described in FIG. 1, a third-party (e.g., merchant) can upload a content item in the serving system (e.g., serving system 100). Alternatively, the serving system, using machine-learning algorithms (e.g., machine-learning algorithms 110) and generative artificial intelligence (AI) techniques, can generate content items. According to some embodiments, a computing system (e.g., serving system 100) can obtain content items. For example, the content items can be received from a merchant or generated by the computing system. The content items can include a first content item, a second content item, and so on. The computing system can include a plurality of serving servers. The plurality of serving servers include a first server, a second server, a third server, and so on. Each server in the plurality of serving servers can be located in a different geographic location (e.g., in order to reduce latency).

At 402, the computing system can classify a first content item with a first-tier label based on a performance attribute of the first content item. For example, when the performance attribute of the first content item is equal to or above a threshold value, then the first content item can be classified as a first-tier content item (e.g., first-tier content item 122). As previously described in FIG. 1, the threshold value can be determined by the ML algorithms 110.

At 404, the computing system can classify a second content item with a second-tier label based on a performance attribute of the second content item. For example, when the performance attribute of the second content item is less than a threshold value, then the second content item can be classified as a second-tier content item (e.g., second-tier content item 124). In some instances, the performance attribute is associated with a number of impressions over a specified period of time. Additionally, the performance attribute can be determined (e.g., calculated, predicted) using a machine-learned prediction model.

In some instances, the system can obtain first-tier performance metrics associated with a plurality of content items classified with the first-tier label. Additionally, the system can obtain second-tier performance metrics associated with a plurality of content items classified with the second-tier label. Moreover, the system can process the first-tier performance metrics and the second-tier performance metrics, using a machine-learned model, to determine the threshold value.

At 406, the computing system can store the first content item and the second content item in the first server. As described in FIG. 2, the first-tier content items, such as the first content item, can be stored (e.g., loaded) in each server in the plurality of servers. Additionally, as described in FIG. 2, the second-tier content items can be divided into subgroups, and each subgroup can be stored in a different server in the plurality of servers. In the example of method 300, the second content item, which is classified as a second-tier content item, can be stored in the first server.

At 408, the computing system can store the first content item in the second server. In the example of method 400, the first content item, which is classified as a first-tier content item, can be stored in both the first and second servers.

In some instances, the system can include a plurality of first-tier content items. The plurality of first-tier content items can include content items classified with the first-tier label, such as the first content item. Each content item in the plurality of first-tier content items can have a performance attribute above a threshold value. Additionally, the system can include a plurality of second-tier content items, such as the second content item. The plurality of second-tier content items can include content items classified with the second-tier label. Each content item in the plurality of second-tier content items can have a performance attribute below a threshold value.

Moreover, the system can store the plurality of first-tier content items in all of the servers in the plurality of servers (e.g., the first server and second server). Furthermore, the system can store a first subgroup of the plurality of second-tier content items in the first server and store a second subgroup of plurality second-tier content items in the second server. The second subgroup includes content items that are not included in the first subgroup. In some instances, to improve latency, the first server can be located in a first geographical location (e.g., Europe) and serve content items to the first geographical location. Similarly, the second server can be located in a second geographical location (e.g., Asia) and server content items to the second geographical location. Additionally, the content items can include targeting conditions, such as geographical region of interest.

Figure 5:
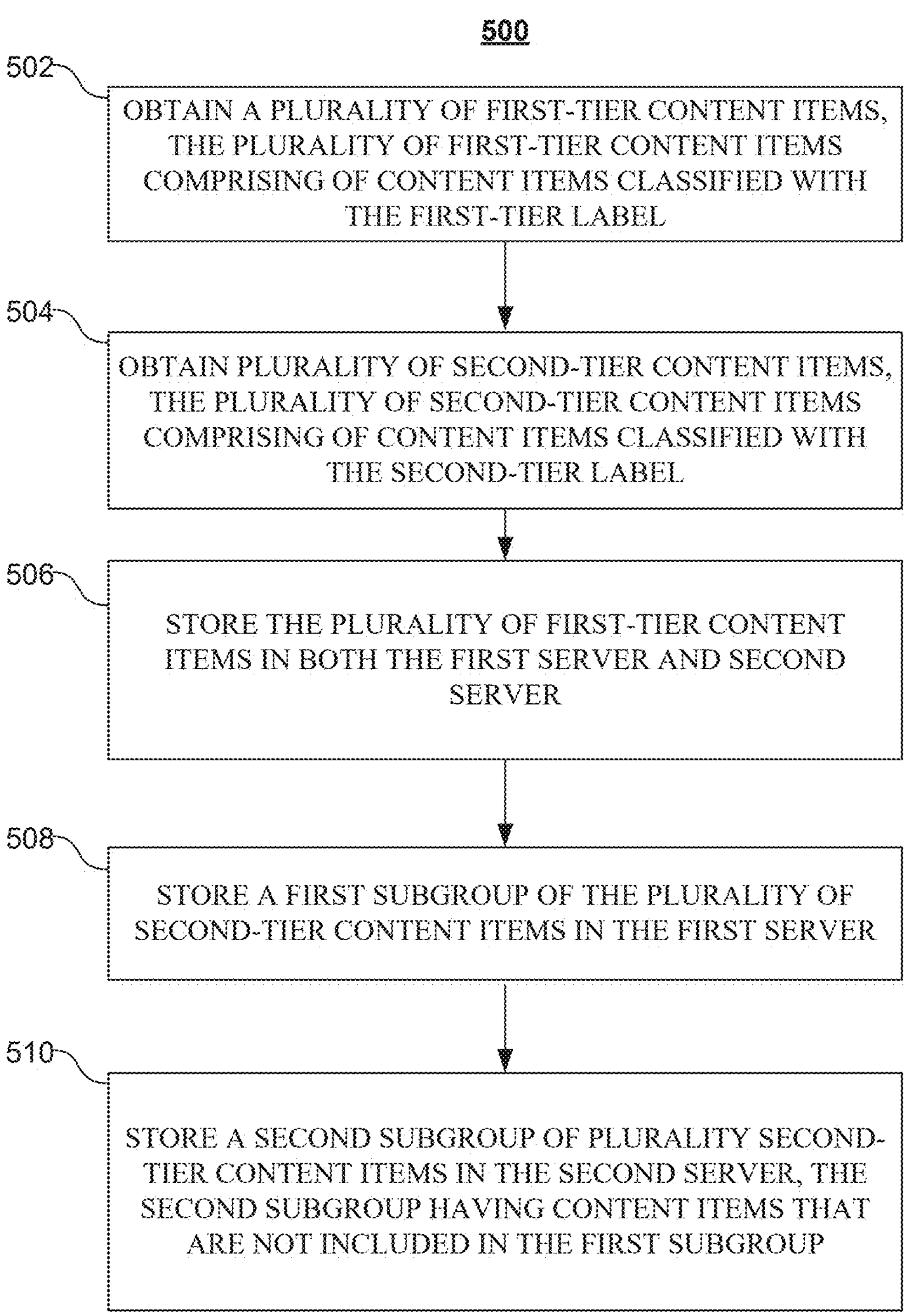
FIG. 5 depicts a flow chart diagram of an example method for storing content items in a serving system according to example embodiments of the present disclosure.

FIG. 5 depicts a flow chart diagram of an example method 500 for storing content items in a serving system according to example embodiments of the present disclosure. Although FIG. 5 depicts steps performed in a particular order for purposes of illustration and discussion, the methods of the present disclosure are not limited to the particularly illustrated order or arrangement. The various steps of method 500 can be omitted, rearranged, combined, and/or adapted in various ways without deviating from the scope of the present disclosure.

At 502, the computing system (e.g., serving system 100) can obtain a plurality of first-tier content items. The plurality of first-tier content items can include content items classified with the first-tier label as described in operation 302 of method 300. In some instances each content item in the plurality of first-tier content items can have a performance attribute equal to or above a threshold value.

At 504, the computing system can obtain a plurality of second-tier content items. The plurality of second-tier content items can include content items classified with the second-tier label, as described in operation 304 and 306 of method 300. Additionally, each content item in the plurality of second-tier content items can have a performance attribute below a threshold value.

At 506, the computing system can store the plurality of first-tier content items in both the first server and second server. As described in FIG. 2, the system can store the content items that were classified as a first-tier content item in all of the servers of the plurality of servers as described at operations 208, 210, and 212 of FIG. 2. All of the content items that have a first-tier classification can be stored in all of the servers in the plurality of servers.

At 508, the computing system can store a first subgroup of the plurality of second-tier content items in the first server. As described in FIG. 2, the system can divide the content items that were classified as a second-tier content item into different subgroups. The system can store each subgroup in a different server in the plurality of servers as described at operations 214, 216, and 218 of FIG. 2.

At 510, the computing system can store a second subgroup of plurality second-tier content items in the second server. The second subgroup can have content items that are not included in the first subgroup.

Example Devices and Systems

Figure 6A:
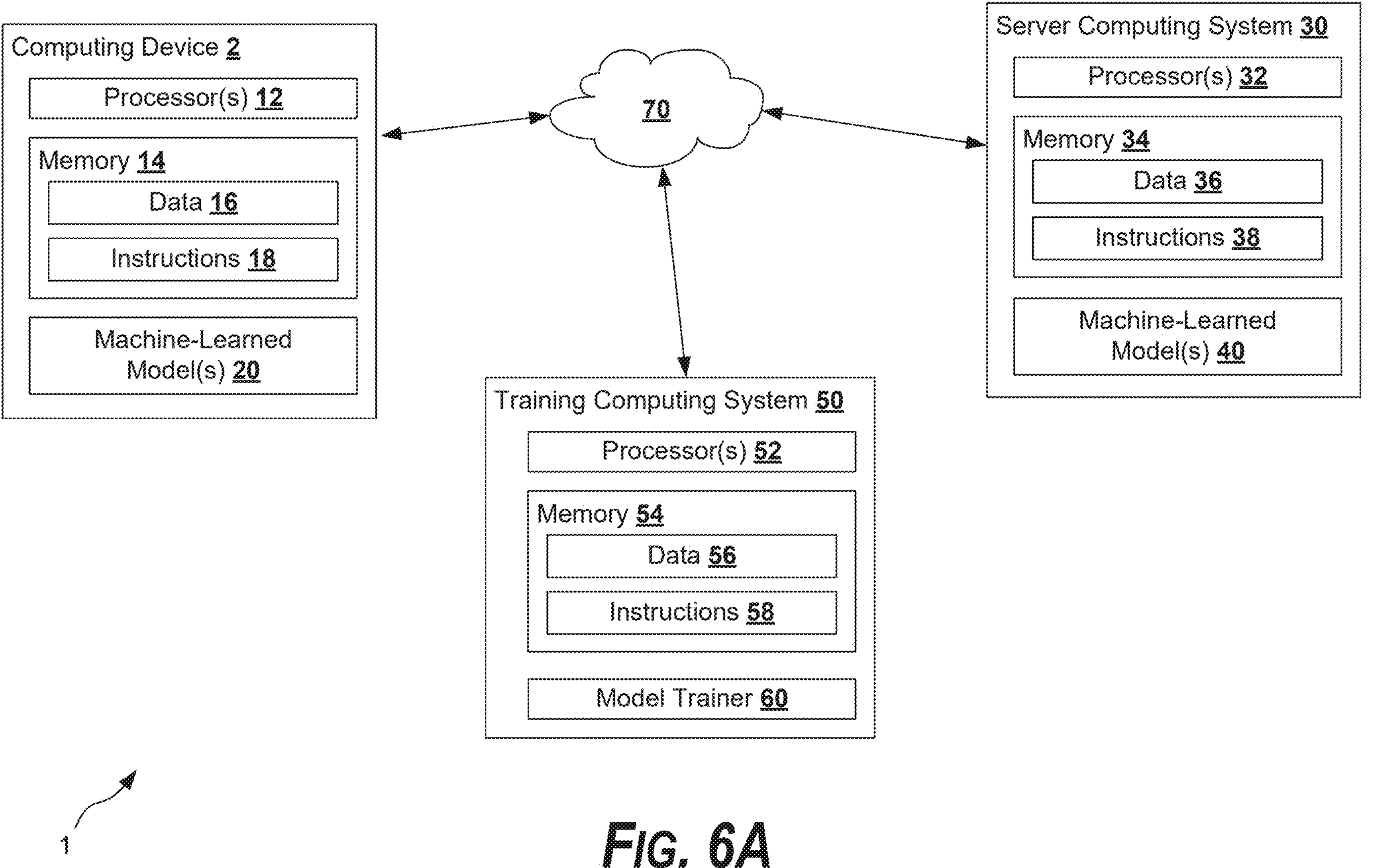
FIG. 6A depicts a block diagram of an example computing system that performs guided content generation according to example embodiments of the present disclosure.

FIG. 6A depicts a block diagram of an example computing system 1 that can perform according to example embodiments of the present disclosure. The system 1 includes a computing device 2, a server computing system 30 (e.g., serving system), and a training computing system 50 that are communicatively coupled over a network 70. In some instances, the serving computing system 30 can be an example of a serving system 100.

The computing device 2 can be any type of computing device, such as, for example, a personal computing device (e.g., laptop or desktop), a mobile computing device (e.g., smartphone or tablet), a gaming console or controller, a wearable computing device, an embedded computing device, or any other type of computing device. In some embodiments, the computing device 2 can be a client computing device. The computing device 2 can include one or more processors 12 and a memory 14. The one or more processors 12 can be any suitable processing device (e.g., a processor core, a microprocessor, an ASIC, an FPGA, a controller, a microcontroller, etc.) and can be one processor or a plurality of processors that are operatively connected. The memory 14 can include one or more non-transitory computer-readable storage media, such as RAM, ROM, EEPROM, EPROM, flash memory devices, magnetic disks, etc., and combinations thereof. The memory 14 can store data 16 and instructions 18 which are executed by the processor 12 to cause the user computing device 2 to perform operations (e.g., to perform operations implementing input data structures and self-consistency output sampling according to example embodiments of the present disclosure, etc.).

In some implementations, the user computing device 2 can store or include one or more machine-learned models 20. For example, the machine-learned models 20 can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, one or more machine-learned models 20 can be received from the server computing system 30 over network 70, stored in the computing device memory 14, and used or otherwise implemented by the one or more processors 12. In some implementations, the computing device 2 can implement multiple parallel instances of a machine-learned model 20.

Additionally, or alternatively, one or more machine-learned models 40 can be included in or otherwise stored and implemented by the server computing system 30 that communicates with the computing device 2 according to a client-server relationship.

Machine-learned model(s) 20 and 40 can include any one or more of the machine-learned models described herein, including the machine-learned model algorithms 110 and any of the component models therein.

The machine-learned models described in this specification may be used in a variety of tasks, applications, and/or use cases. Although described throughout with respect to example implementations for applications in medical domains, it is to be understood that the techniques described herein may be used for other tasks in various technological fields.

In some implementations, the input to the machine-learned model(s) of the present disclosure can be statistical data (e.g., analytics data 114, performance metrics 116). Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some embodiments, the machine-learned models 40 can be implemented by the server computing system 30 as a portion of a web service (e.g., remote machine-learned model hosting service, such as an online interface for performing machine-learned model operations over a network on remote servers 30). For instance, the server computing system 30 can communicate with the computing device 2 over a local intranet or internet connection. For instance, the computing device 2 can be a workstation or endpoint in communication with the server computing system 30, with implementation of the model 40 on the server computing system 30 being remotely performed and an output provided (e.g., cast, streamed, etc.) to the computing device 2. Thus, one or more models 20 can be stored and implemented at the user computing device 2 or one or more models 40 can be stored and implemented at the server computing system 30.

The computing device 2 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the computing device 2 is a user endpoint associated with a user account of a campaign generation system. The campaign generation system can operate on the server computing system 30.

The server computing system 30 can include one or more processors 32 and a memory 34. The one or more processors 32 can be any suitable processing device (e.g., a processor core, a microprocessor, an ASIC, an FPGA, a controller, a microcontroller, etc.) and can be one processor or a plurality of processors that are operatively connected. The memory 34 can include one or more non-transitory computer-readable storage media, such as RAM, ROM, EEPROM, EPROM, flash memory devices, magnetic disks, etc., and combinations thereof. The memory 34 can store data 36 and instructions 38 which are executed by the processor 32 to cause the server computing system 30 to perform operations.

In some implementations, the server computing system 30 includes or is otherwise implemented by one or more server computing devices. In instances in which the server computing system 130 includes plural server computing devices (e.g., first server computing system, second server computing system, third server computing system), such server computing devices can operate according to sequential computing architectures, parallel computing architectures, or some combination thereof. As described in FIGS. 1-4, the first-tier content items can be replicated and stored in the first computing system, second server computing system, and third server computing system. Additionally, the second-tier content items can be divided into different subgroups. The first subgroup can be stored in a first server computing system, the second group can be stored in a second server computing system, the third subgroup can be stored in a third server computing system, and so on.

As described above, the server computing system 30 can store or otherwise include one or more machine-learned models 40. For example, the models 40 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The machine-learned models 40 can determine a threshold value (e.g., threshold value 112) to be utilized in the classification of a content item. The machine-learned models 40 can also determine which server in the plurality of servers to store a second-tier content item.

The computing device 2 or the server computing system 30 can train example embodiments of a machine-learned model (e.g., including models 20 or 40) using a training pipeline (e.g., an unsupervised pipeline, a semi-supervised pipeline, etc.). In some embodiments, the computing device 2 or the server computing system 30 can train example embodiments of a machine-learned model (e.g., including models 20 or 40) using analytics data 114 and performance metrics 116, and information derived from third-party campaigns 106. In some embodiments, the computing device 2 or the server computing system 30 can train example embodiments of a machine-learned model (e.g., including models 20 or 40) using a pre-training pipeline by interaction with the training computing system 50. In some embodiments, the training computing system 50 can be communicatively coupled over the network 70. The training computing system 50 can be separate from the server computing system 30 or can be a portion of the server computing system 30.

The training computing system 50 can include one or more processors 52 and a memory 54. The one or more processors 52 can be any suitable processing device (e.g., a processor core, a microprocessor, an ASIC, an FPGA, a controller, a microcontroller, etc.) and can be one processor or a plurality of processors that are operatively connected. The memory 54 can include one or more non-transitory computer-readable storage media, such as RAM, ROM, EEPROM, EPROM, flash memory devices, magnetic disks, etc., and combinations thereof. The memory 54 can store data 56 and instructions 58 which are executed by the processor 52 to cause the training computing system 50 to perform operations (e.g., to perform operations implementing input data structures and self-consistency output sampling according to example embodiments of the present disclosure, etc.). In some implementations, the training computing system 50 includes or is otherwise implemented by one or more server computing devices.

The model trainer 60 can include a training pipeline for training machine-learned models using various objectives. Parameters of the image-processing model(s) can be trained, in some embodiments, using various training or learning techniques, such as, for example, backwards propagation of errors. For example, an objective or loss can be back propagated through the pretraining pipeline(s) to update one or more parameters of the model(s) (e.g., based on a gradient of the loss function). Various determinations of loss can be used, such as mean squared error, likelihood loss, cross entropy loss, hinge loss, or various other loss functions. Gradient descent techniques can be used to iteratively update the parameters over a number of training iterations. In some implementations, performing backwards propagation of errors can include performing truncated backpropagation through time. The pretraining pipeline can perform a number of generalization techniques (e.g., weight decays, dropouts, etc.) to improve the generalization capability of the models being trained.

The model trainer 60 can train one or more machine-learned models 20 or 40 using training data (e.g., data 56). The training data can include, for example, historical performance data, past user interactions, and/or past campaigns.

The model trainer 60 can include computer logic utilized to provide desired functionality. The model trainer 60 can be implemented in hardware, firmware, or software controlling a general-purpose processor. For example, in some implementations, the model trainer 60 includes program files stored on a storage device, loaded into a memory, and executed by one or more processors. In other implementations, the model trainer 60 includes one or more sets of computer-executable instructions that are stored in a tangible computer-readable storage medium such as RAM, hard disk, or optical or magnetic media.

The network 70 can be any type of communications network, such as a local area network (e.g., intranet), wide area network (e.g., Internet), or some combination thereof and can include any number of wired or wireless links. In general, communication over the network 70 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

FIG. 6A illustrates one example computing system that can be used to implement the present disclosure. Other computing systems can be used as well. For example, in some implementations, the computing device 2 can include the model trainer 60. In some implementations, the computing device 2 can implement the model trainer 60 to personalize the model(s) based on device-specific data.

Figure 6B:
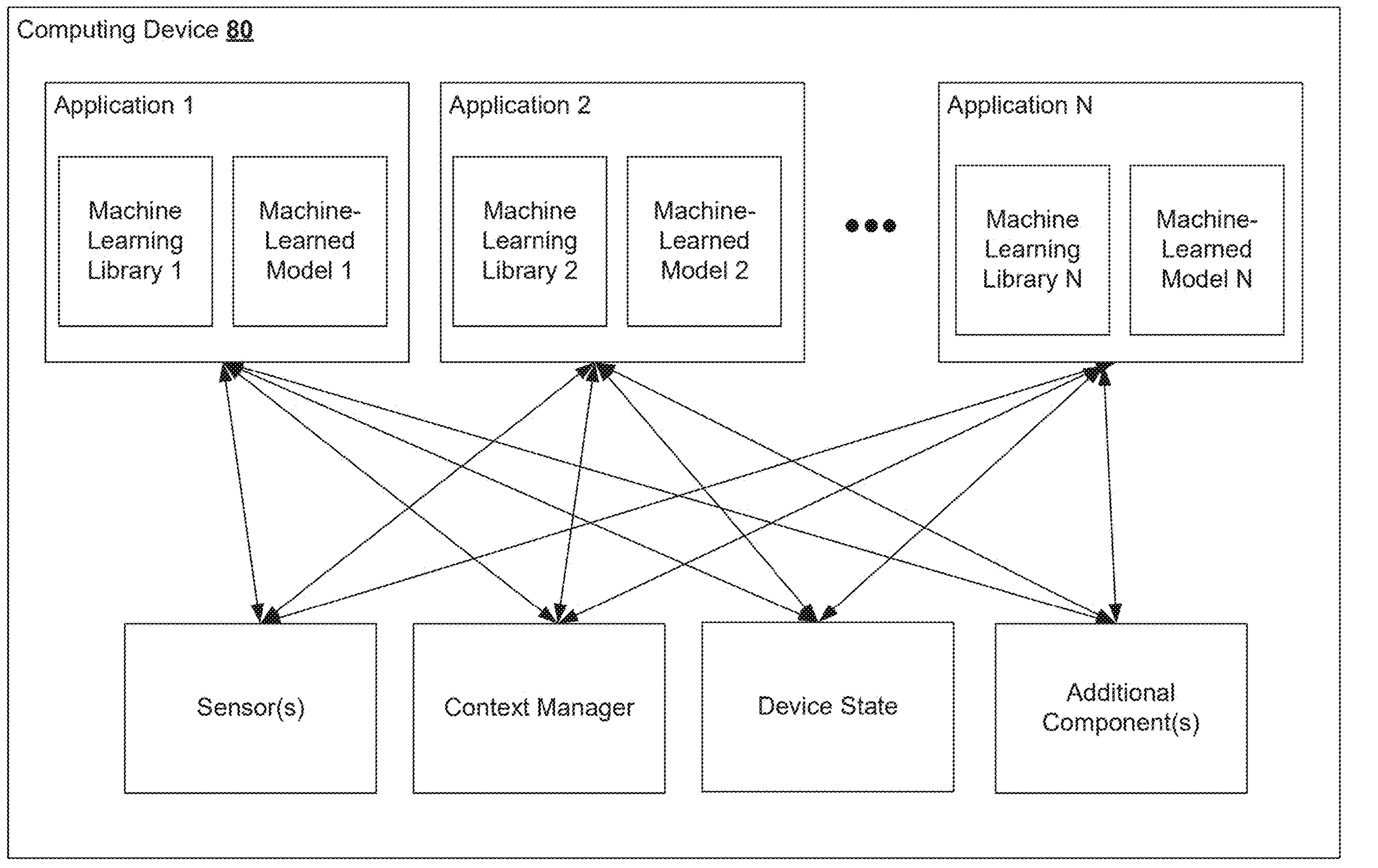
FIG. 6B depicts a block diagram of an example computing device that performs guided content generation according to example embodiments of the present disclosure.

FIG. 6B depicts a block diagram of an example computing device 80 that performs according to example embodiments of the present disclosure. The computing device 80 can be a user computing device or a server computing device. The computing device 80 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 6B, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 6C:
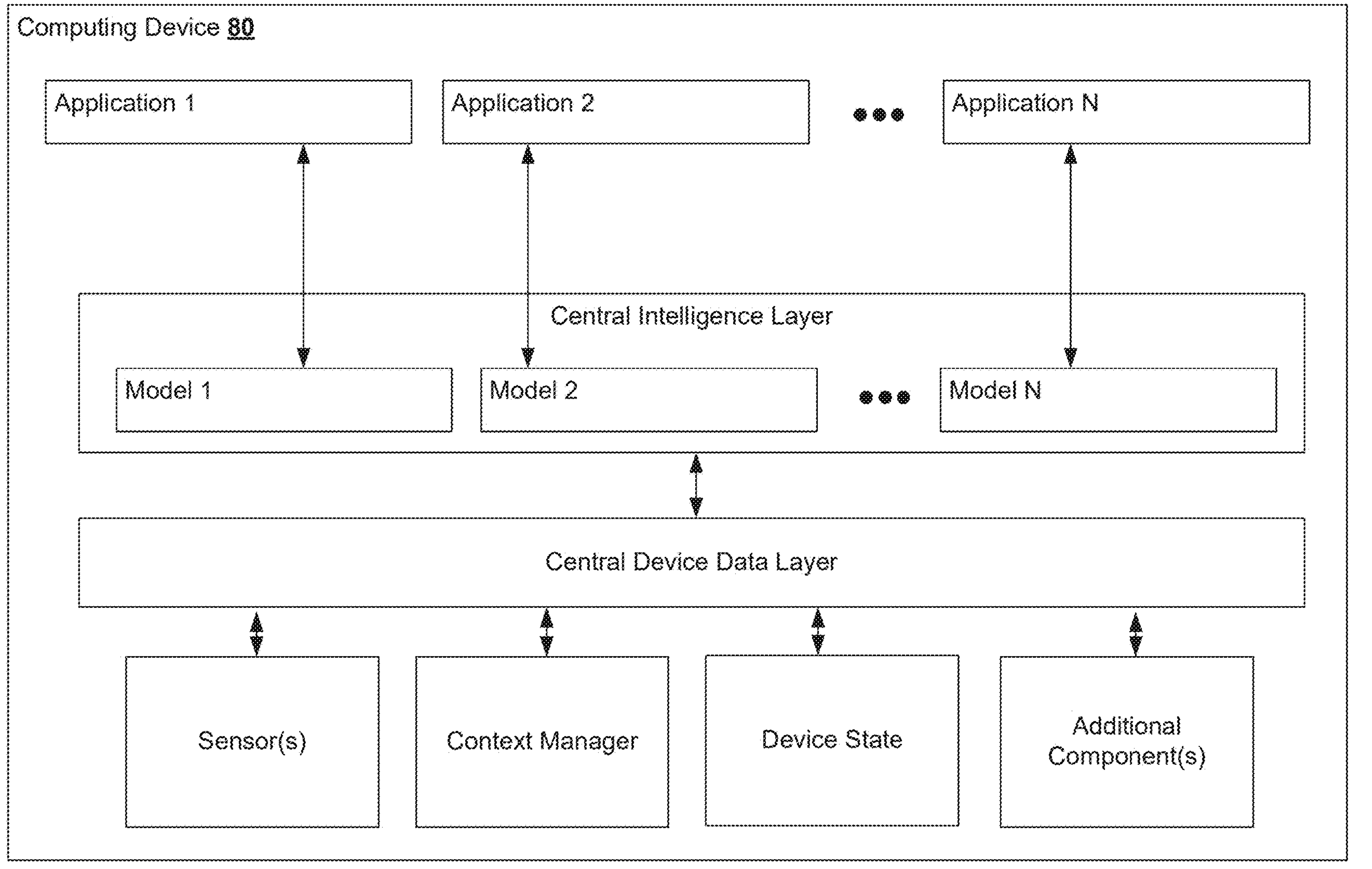
FIG. 6C depicts a block diagram of an example computing device that performs guided content generation according to example embodiments of the present disclosure.

FIG. 6C depicts a block diagram of an example computing device 80 that performs according to example embodiments of the present disclosure. The computing device 80 can be a user computing device or a server computing device. The computing device 80 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 6C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 80.

The central intelligence layer can communicate with a central device data layer. The central device data layer can be a centralized repository of data for the computing device 80. As illustrated in FIG. 6C, the central device data layer can communicate with a number of other components of the computing device, such as, for example, one or more sensors, a context manager, a device state component, or additional components. In some implementations, the central device data layer can communicate with each device component using an API (e.g., a private API).

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example of how implementations can operate or be configured is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of," "any combination of" example elements listed therein, etc. Also, terms such as "based on" should be understood as "based at least in part on."

What is claimed is:

1. A computing system, comprising:

one or more processors;

a plurality of serving servers, the plurality of serving servers including a first server and a second server;

one or more non-transitory computer-readable media that collectively store instructions that, when executed by the one or more processors, cause the computing system to perform operations, the operations comprising:

classifying a first content item with a first-tier label based on a performance attribute of the first content item;

classifying a second content item with a second-tier label based on a performance attribute of the second content item, wherein the performance attribute of the second content item is less than a threshold value;

classifying a third content item with the second-tier label based on a performance attribute of the third content item, wherein the performance attribute of the third content item is less than the threshold value;

storing the first content item and the second content item in the first server; and storing the first content item and the third content item in the second server.

2. The computing system of claim 1, the operations further comprising:

classifying a fourth content item with a first tier-label based on a performance attribute of the fourth content item, the performance attribute of the fourth content item being above the threshold value; and storing the fourth content item in the first server and the second server.

3. The computing system of claim 1, wherein the plurality of servers includes a third server, the operations further comprising:

classifying a fifth content item with a second tier-label based on a performance attribute of the fifth content item being below the threshold value; and storing the fifth content item in the third server.

4. The computing system of claim 1, the operations further comprising:

a plurality of first-tier content items, the plurality of first-tier content items comprising of content items classified with the first-tier label;

a plurality of second-tier content items, the plurality of second-tier content items comprising of content items classified with the second-tier label;

the operations further comprising:

storing the plurality of first-tier content items in the first server and second server;

storing a first subgroup of the plurality of second-tier content items in the first server; and storing a second subgroup of plurality second-tier content items in the second server, the second subgroup having content items that are not included in the first subgroup.

5. The computing system of claim 4, wherein each content item in the plurality of first-tier content items having a performance attribute above a threshold value, and wherein each content item in the plurality of second-tier content items having a performance attribute below a threshold value.

6. The computing system of claim 4, wherein each server in the plurality of servers is a serving replica server, and each serving replica server stores a unique subset of the plurality of second-tier content items.

7. The computing system of claim 1, the operations further comprising:

obtaining first-tier performance metrics associated with a plurality of content items classified with the first-tier label;

obtaining second-tier performance metrics associated with a plurality of content items classified with the second-tier label; and processing the first-tier performance metrics and the second-tier performance metrics, using a machine-learned model, to determine the threshold value.

8. The computing system of claim 1, wherein the first server stores content items that are served in a first geographical region, and wherein the second server stores content items that are served in a second geographical region.

9. The computing system of claim 7, wherein the second content item includes a first targeting condition associated with the first geographic region, wherein the third content item includes a second target condition associated with the second geographic region, and the operations further comprising:

determining to store the second content item in the first server based on the first target condition; and determining to store the third content item in the second server based on the second target condition.

10. The computing system of claim 8, wherein the first target condition for the second content item is received from a merchant associated with the second content item.

11. The computing system of claim 1, wherein the performance attribute is associated with a number of impressions over a specified period of time.

12. The computing system of claim 1, wherein the performance attribute is calculated using a machine-learned prediction model.

13. The computing system of claim 1, wherein the performance attribute of the second content item is updated to be more than the threshold value, the operations further comprising:

re-classifying the second content item with the first-tier label; and storing the second content item in the second server and a third server.

14. The computing system of claim 1, wherein the performance attribute of the first content item is updated to be less than the threshold value, the operations further comprising:

re-classifying the first content item with the second-tier label; and removing the first content item from the second server.

15. A computer-implemented method for serving content items, the method comprising:

classifying a first content item with a first-tier label based on a performance attribute of the first content item;

classifying a second content item with a second-tier label based on a performance attribute of the second content item, wherein the performance attribute of the second content item is less than a threshold value;

classifying a third content item with a second-tier label based on a performance attribute of the third content item, wherein the performance attribute of the third content item is less than the threshold value;

storing the first content item and the second content item in a first server in a plurality of servers; and storing the first content item and the third content item in a second server in the plurality of servers.

16. The method of claim 15, wherein the plurality of servers includes a third server, the method further comprising:

classifying a fourth content item with a first tier-label based on a performance attribute of the fourth content item, the performance attribute of the fourth content item being above the threshold value;

storing the fourth content item in the first server and the second server;

classifying a fifth content item with a second tier-label based on a performance attribute of the fifth content item being below the threshold value; and storing the fifth content item in the third server.

17. The method of claim 15, the method further comprising:

storing a plurality of first-tier content items in the first server and second server, wherein the plurality of first-tier content items comprising of content items classified with the first-tier label, and wherein each content item in the plurality of first-tier content items having a performance attribute above a threshold value;

storing a first subgroup of a plurality of second-tier content items in the first server, wherein the plurality of second-tier content items comprising of content items classified with the second-tier label, wherein each content item in the plurality of second-tier content items having a performance attribute below a threshold value; and storing a second subgroup of the plurality second-tier content items in the second server, the second subgroup having content items that are not included in the first subgroup.

18. The method of claim 15, the method further comprising:

obtaining first-tier performance metrics associated with a plurality of content items classified with the first-tier label;

obtaining second-tier performance metrics associated with a plurality of content items classified with the second-tier label; and processing the first-tier performance metrics and the second-tier performance metrics, using a machine-learned model, to determine the threshold value.

19. The method of claim 15, wherein the first server stores content items that are served in a first geographical region, wherein the second server stores content items that are served in a second geographical region, wherein the second content item includes a first targeting condition associated with the first geographic region, wherein the third content item includes a second target condition associated with the second geographic region, and the method further comprising:

determining to store the second content item in the first server based on the first target condition; and determining to store the third content item in the second server based on the second target condition.

20. One or more non-transitory computer-readable media that collectively store instructions that, when executed by one or more computing devices, cause the one or more computing devices to perform operations, the operations comprising:

classifying a first content item with a first-tier label based on a performance attribute of the first content item;

classifying a second content item with a second-tier label based on a performance attribute of the second content item, wherein the performance attribute of the second content item is less than a threshold value;

classifying a third content item with a second-tier label based on a performance attribute of the third content item, wherein the performance attribute of the third content item is less than the threshold value;

storing the first content item and the second content item in a first server in a plurality of servers; and storing the first content item and the third content item in a second server in the plurality of servers.

* * * * *